US006488123B2

(12) United States Patent
Pitts et al.

(10) Patent No.: US 6,488,123 B2
(45) Date of Patent: Dec. 3, 2002

(54) DIRECTIONAL UNIFORMITY OF FLAT TENSION MEMBERS FOR ELEVATORS

(75) Inventors: John T. Pitts, Avon, CT (US); Hugh J. O'Donnell, Longmeadow, MA (US); Hubert E. Göser, Dannenberg (DE)

(73) Assignee: Otis Elevator Company, Farmington, CT (US)

( * ) Notice: Subject to any disclaimer, the term of this patent is extended or adjusted under 35 U.S.C. 154(b) by 13 days.

(21) Appl. No.: 09/781,366

(22) Filed: Feb. 12, 2001

(65) Prior Publication Data

US 2002/0108814 A1 Aug. 15, 2002

(51) Int. Cl.[7] .............................. D07B 1/22; F16G 1/00; F16G 9/00

(52) U.S. Cl. ........................................ 187/251; 187/254

(58) Field of Search .................................. 187/251, 254

(56) References Cited

U.S. PATENT DOCUMENTS 6,068,087 A * 5/2000 Moncini ..................... 187/252

FOREIGN PATENT DOCUMENTS

| | | | |
|---|---|---|---|
| JP | 2000-88061 | * | 3/2000 |
| JP | 2000-97288 | * | 4/2000 |
| WO | 9829327 | * | 7/1998 |

* cited by examiner

*Primary Examiner*—Steven A. Bratlie

(57) ABSTRACT

A method of manufacturing and installing multiple flat tension members in an elevator system where the direction of manufacture is determined for each of the flat tension members. Each member is marked to indicate the direction of manufacture. The belts are then installed in an elevator system by aligning the belts in accordance with the marks such that each belt is aligned in the same direction.

6 Claims, 3 Drawing Sheets

FIG. 1
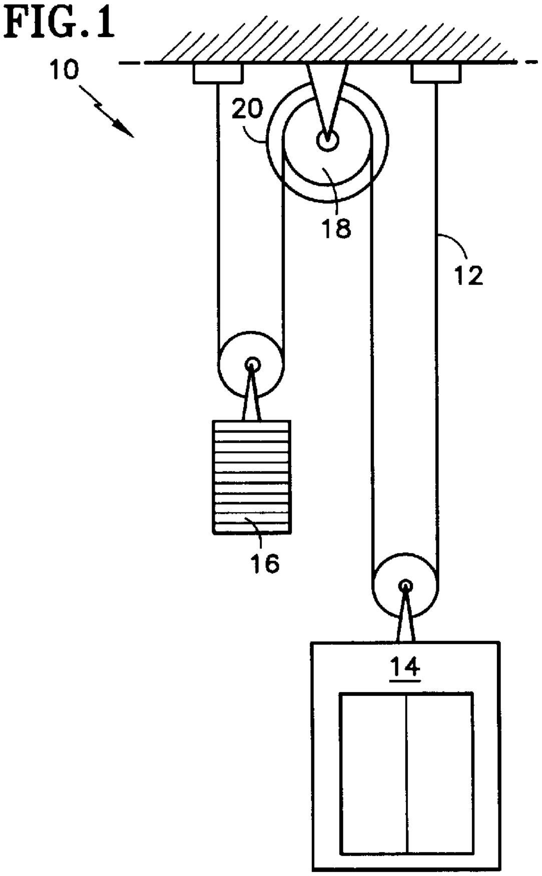
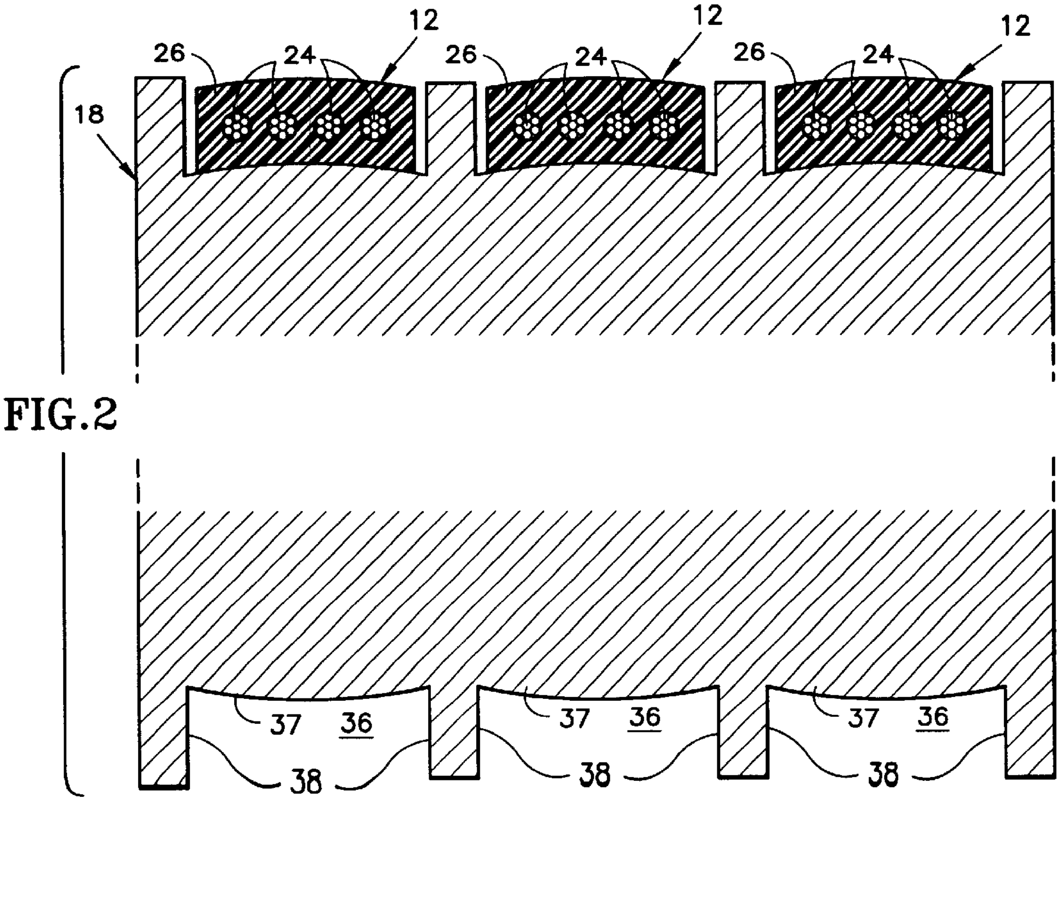
FIG. 2

FIG.3
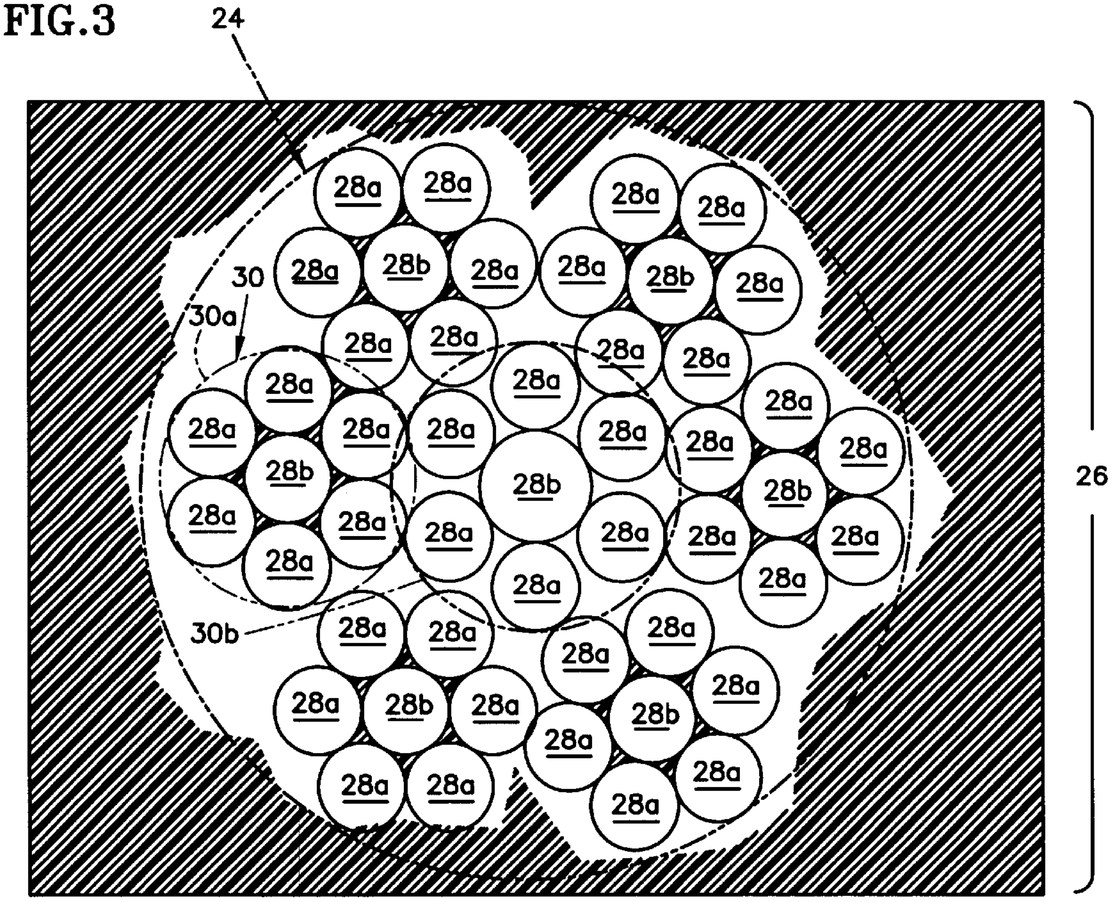
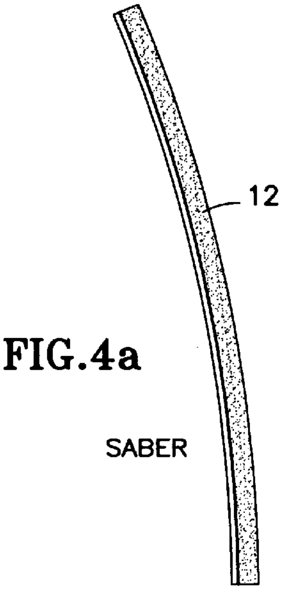
FIG.4a
FIG.4b
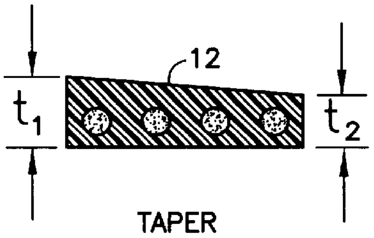

DIRECTIONAL UNIFORMITY OF FLAT TENSION MEMBERS FOR ELEVATORS

FIELD OF INVENTION

This invention relates to a method for manufacturing and installing a plurality of flat tension members in an elevator system and to an elevator system having a plurality of flat tension members or belts.

BACKGROUND OF INVENTION

Conventional traction elevator systems typically include a passenger car, a counterweight, two or more tension members or belts interconnecting the car and counterweight, a traction sheave to move the tension members, and a machine to rotate the traction sheave. The machine may be geared or gearless and the tension members may be round.

Flat tension members are defined as having an aspect ratio of greater than one, where the aspect ratio is defined as the ratio of tension member width w to thickness t (Aspect Ratio=w/t). The actual surface of the flat tension member is not necessarily flat. The term flat tension member refers to any rope having as aspect ratio greater than one.

The tension members normally fit within a groove located on the sheave. The grooves have a surface complementary to that of the belt interfacing with the sheave.

Flat tension members as described in PCT publication WO 00/37,738 consist of a plurality of load carrying cords formed from high tensile strength material encased within a coating such as thermoplastic polyurethane. The cords are constructed of high tensile strength fibers such as twisted steel or aramid strands, which are in turn constructed of twisted steel or aramid wires.

The flat tension members represent an improvement over round cables in that they offer reduced rope pressure and increased flexibility, which allows for smaller sheaves.

However, the flat tension members are not perfectly uniform along their length or cross section. There are slight variations that occur along the length of the belt such as saber, which is a curvature of the belt, and taper which is a lateral dimensional variation. Saber and taper cause the flat belts to track (move) either left or right across the sheave groove.

The cordage helix angle, which is the left or right design angle of the twist of the steel or aramid fibers in the cords and the cordage residual torque, which is the twisting force created during manufacturing, also cause the flat tension members to track either right or left across the grooves of the sheave.

Elevator systems commonly comprise multiple belts running in parallel within grooves over the sheave. During installation the sheave is aligned to cause the flat tension members to track within the center of the individual grooves of the sheave to minimize wear on the belts caused by friction, and pressure, which reduce belt life. However, alignment is especially difficult when the individual belts track in opposite directions at the same time. This dictates a sheave design with sufficient margin to account for tracking errors, resulting in increased sheave size.

Therefore there exists a need to improve the method of manufacture and installation to reduce the effects of tracking.

There further exists an improved method of manufacture and installation to reduce sheave size.

There further exists a need for an improved elevator system having a reduced sheave size.

SUMMARY OF INVENTION

In view of the foregoing disadvantages inherent in the conventional methods and systems in the prior art, the present invention provides for an improved method of manufacturing and installing flat tension members in an elevator system to minimize the effects of tracking to allow for a reduced sheave size.

To accomplish this goal, the present invention incorporates a mark or multiple marks on or in a surface of the flat tension member. The mark indicates the direction of manufacture of the belt.

The belts are then installed in the elevator system by observing the direction indicated by the mark such that all belts are installed in the same direction. The sheave is then aligned such that each belt tracks in the middle of its associated groove. By installing the belts in the same direction, the belts will tend to track left and right across the sheave together, minimizing the total tracking error at any one time. This also simplifies alignment of the sheave to minimize tracking error. Reduction of the total tracking error also allows for reduced sheave size.

In a further embodiment of the invention, the marks are applied at a known point of manufacture of the belt, which is a known distance from an end of the belt. The belts are then installed in the elevator system by aligning the marks such that the belts are installed in the same direction and the corresponding points of manufacture along the belt are aligned. The sheave is then aligned such that the each belt tracks in the middle of its associated groove. In this embodiment the belts are not only aligned in the same direction but each point on belt is also aligned to further ensure that the tracking differences between the belts is minimized.

In yet a further embodiment, the marks are repeated at known intervals. The method and system described herein improves upon the prior art by reducing tracking errors associated with the use of flat tension members in elevator systems. The elimination of such errors improves the life of the belts, reduces sheave size, and reduces installation time.

BRIEF DESCRIPTION OF THE DRAWINGS

FIG. 1 is a diagrammatic view of an elevator system having a traction drive;

FIGS. 2 is a cross sectional view of flat tension members positioned in sheave grooves;

FIG. 3 is a cross sectional view of a cord;

FIG. 4*a* is a perspective view of a flat tension member exhibiting saber;

FIG. 4*b* is a cross sectional view of a flat tension member exhibiting taper;

DETAILED DESCRIPTION OF THE INVENTION

Figure 6:
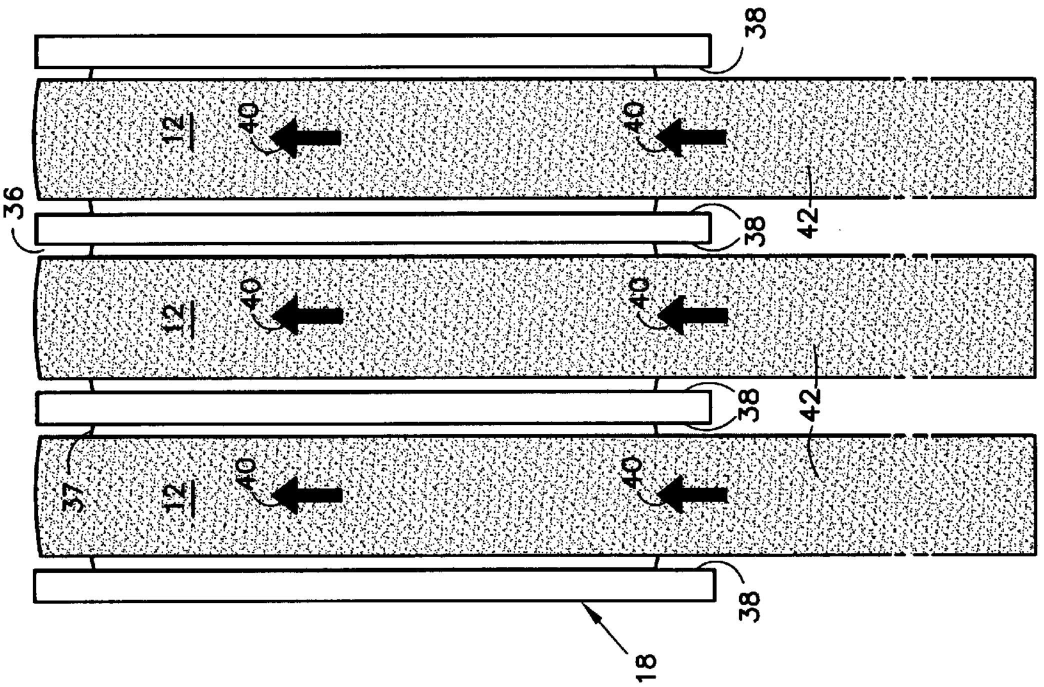
FIG. 6 is a front view of multiple flat tension members and sheave according to a second embodiment of the present invention.

Referring to FIG. 1 an elevator systems 10, consisting of flat tension members or belts 12. These tension members 12 connect the car 14 and counterweight 16 and are driven by the sheave 18, which in turn is driven by a machine 20 to position the car 14 within a hoistway (not shown).

The flat belts 12, shown in FIG. 2, consist of a several cords 24, which are encased in an elastomeric coating 26. As shown in FIG. 3, the individual strands 24 consist of either metallic or fiber outer elements 28*a* that are twisted around a central element 28*b* to form a strand 30. The multiple outer strands 30*a* are twisted around a central strand 30*b* to form a cord 24.

The angle of the outer elements 28*a* to inner element 28*b* and the angle of the outer strands 30*a* to the inner strand 30*b* are known as the helix angles. Applying tension to a belt, with all cordage helix angles the same, will cause lateral motion in the helix direction. Residual torque can create a belt twist angle, which will influence belt lateral direction under a load. The surface 37 of the groove is crowned to help control belt tracking.

In addition to helix angle and residual torque, there are other belt characteristics that affect tracking. The belts 12 are not perfectly uniform over their entire length. As shown in FIGS. 4*a* and *b*, flat belts 12 exhibit characteristics such as saber (longitudinal curvature) and taper (variations in thickness from edge to edge). These belt characteristics are dependent on the direction of manufacture of the belt 12. Whether the cords 24 are laid out lengthwise and coated at one time or drawn through a process where they are coated as they are drawn through, the imperfections in the belts 12 will be consistent from belt to belt and dependent on the direction of manufacture as long as the process is repeatable. The belts may be manufactured individually or as a set.

During operation the elevator system 10, the effect of taper, saber, residual torque, and helix angle causes the belts 12 to track left and right across the grooves 36 of sheave 18 as it is rotated the machine 20. During installation the sheave 18 steering angle is adjusted to cause the belts 12 to track in the middle of the grooves 36 to minimize friction and pressure between the sidewalls 38 of the grooves 36. The effect of tracking is especially pronounced when the belts 12 track in opposite directions at the same time.

To minimize the effect of tracking thereby increasing belt life, belts 12 according to the present invention are marked 40 during manufacture to indicate the direction of manufacture.

The marks 40 may be applied by an automated process or manually and may be applied to the surface 42 of the belt by painting, applying a decal, or other suitable means. Note, the mark 40 should be applied to same surface 42 for each belt relative to the manufacture thereof. The mark 40 may also be embedded in the surface 42 of the belt by stamping or etching the surface. The marks 40 may be applied to each belt 12 individually or to a set of belts at the same time.

Figure 5:
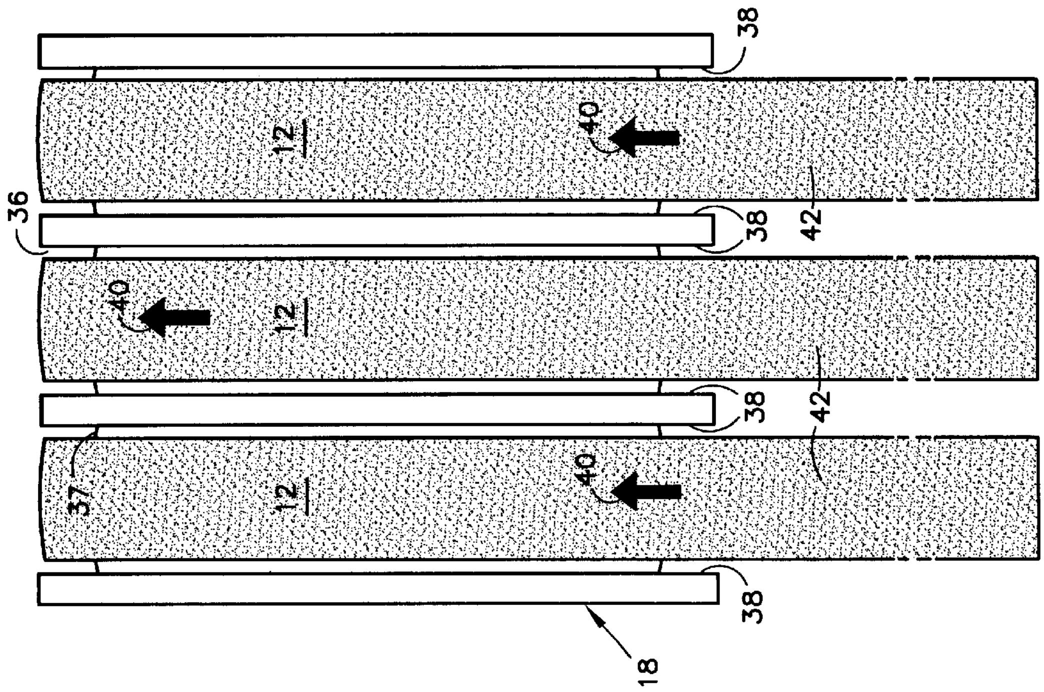
FIG. 5 is a front view of multiple flat tension members and sheave according to the present invention.

The belts 12 are then installed in the elevator system 10 by aligning the marks 40 such that all marks 40 point in the same direction. It does not matter whether the marks 40 indicate a direction of manufacture oriented toward the car 12 or the counterweight 16, as long as they all point in the same direction. FIG. 5 illustrates a set of belts 12 installed according to the present invention in the area of the sheave 18.

By aligning the belts 12 in the same direction the belts 12 will track in the same direction at the same time minimizing the effects of tracking.

In a second embodiment, as shown in FIG. 6 of the subject invention, the marks 40 are applied a predetermined distance from a first end of the belts 12. The marks 40 may then be repeated at predetermined intervals. The belts are then installed in the system 10 such that the marks 40 are not only aligned in the same direction, but also aligned from belt to belt in line perpendicular to the direction of travel. This ensures that the belts 12 are aligned in the same direction and that corresponding points of manufacture are aligned to further improve tracking. Furthermore changes in the alignment of the marks 40 from belt to belt 12 will indicate that one or more of the belts 12 has degraded and stretched and need to be replaced.

Although the preferred embodiments have been described herein, it is to be understood that the invention is not limited thereto and encompasses all embodiments that come within the scope of the following claims.

What is claimed is:

1. A method of manufacturing and installing multiple flat tension members for an elevator system comprising the steps:

determining a direction of manufacture for each of said flat tension members;

applying a mark to each of said flat tension members indicative of said direction of manufacture at a predetermined distance from a first end of each of said flat tension members;

installing said multiple flat tension members in said elevator system by using said marks to orient each of said flat tension members in a common direction and to align said mark of each of said belts in a line perpendicular to a direction of travel of said multiple flat tension members; and observing said mark of each of said belts to determine when they are no longer aligned for monitoring belt degradation.

2. The method of claim 1 further comprising the step of forming each of said flat tension members individually.

3. The method of claim 1 further comprising the step of forming said multiple flat tension members in a set.

4. The method of claim 2 wherein the step of determining a direction further comprises the step of observing said forming step to determine said direction of manufacture.

5. The method of claim 3 wherein the step of determining a direction further comprises the step of observing said forming step to determine said direction.

6. The method of claim 1 wherein said step of applying is performed automatically.

* * * * *

UNITED STATES PATENT AND TRADEMARK OFFICE

CERTIFICATE OF CORRECTION

PATENT NO. : 6,488,123 B2
DATED : December 3, 2002
INVENTOR(S) : John T. Pitts, Hugh J. O'Donnell and Hubert E. Goeser It is certified that error appears in the above-identified patent and that said Letters Patent is hereby corrected as shown below:

Title page,
Item [73], Assignee, please add -- Contitech Antriebssysteme GmbH, Hannover (DE) --

Signed and Sealed this

Twenty-sixth Day of August, 2003

JAMES E. ROGAN
*Director of the United States Patent and Trademark Office*